United States Patent
Saika (10) Patent No.: US 7,516,199 B2
(45) Date of Patent: Apr. 7, 2009

(54) STORAGE DEVICE MANAGING SYSTEM, METHOD AND PROGRAM

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 807 days.

(21) Appl. No.: 10/649,171

(22) Filed: Aug. 26, 2003

(65) Prior Publication Data

US 2004/0122909 A1  Jun. 24, 2004

(30) Foreign Application Priority Data

Dec. 13, 2002  (JP)  ............................. 2002-361715

(51) Int. Cl.
  *G06F 15/167*  (2006.01)
  *G06F 15/16*  (2006.01)
(52) U.S. Cl. ...................... 709/219; 709/216
(58) Field of Classification Search ................. 709/213, 709/216, 231, 219
  See application file for complete search history.

(56) References Cited

U.S. PATENT DOCUMENTS

| | | | |
|---|---|---|---|
| 6,330,605 B1 * | 12/2001 | Christensen et al. | 709/226 |
| 6,370,687 B1 * | 4/2002 | Shimura | 717/146 |
| 6,665,721 B1 * | 12/2003 | Hind et al. | 709/227 |
| 6,775,695 B1 * | 8/2004 | Sarukkai | 709/219 |
| 7,020,719 B1 * | 3/2006 | Grove et al. | 709/238 |
| 7,200,644 B1 * | 4/2007 | Flanagan | 709/219 |
| 2001/0037389 A1 | 11/2001 | Fujimori et al. | |
| 2002/0059371 A1 | 5/2002 | Jamail et al. | |
| 2002/0083133 A1 | 6/2002 | Feigenbaum | |
| 2003/0074425 A1 * | 4/2003 | Kawakita | 709/219 |
| 2003/0195940 A1 | 10/2003 | Basu et al. | |

FOREIGN PATENT DOCUMENTS

| | | |
|---|---|---|
| JP | 09-008907 A | 1/1997 |
| JP | 10-171662 A | 6/1998 |
| JP | 11-272711 | 10/1999 |
| JP | 2001-084220 A | 3/2001 |
| JP | 2002-149534 A | 5/2002 |
| JP | 10-294755 A | 11/2004 |
| WO | WO02/27519 A1 | 4/2002 |

* cited by examiner

*Primary Examiner*—Kristie D Shingles
(74) *Attorney, Agent, or Firm*—Townsend and Townsend and Crew LLP (57) ABSTRACT

A storage-device controlling apparatus includes the following configuration components: a file system for receiving a data input/output request on file-name specification basis, and executing the input/output of data with respect to a storage device in response to the data input/output request, the data input/output request being transmitted via a network, a unit for accepting a proxy request for substitute-executing the download of a file from a Web server on the Internet, the proxy request being transmitted based on the HTTP protocol via the network, a unit for establishing a connection with the Internet, a unit for downloading the file from the Web server in response to the proxy request, and a unit for storing the downloaded file into the storage device by using the file system.

12 Claims, 7 Drawing Sheets

THE PROXY FUNCTION HAS ACCEPTED
THE DOWNLOAD OF A FILE DESCRIBED
BELOW.

<ACCEPTANCE TIME-AND-DATE>
2002/11/5 10:15:10

<FILE NAME>
XXXX.zip

<DOWNLOAD LOCATION>
http://www.yyy.co.jp/whitepaper

<STORAGE LOCATION>
/user001/20021105/001

STORAGE DEVICE MANAGING SYSTEM, METHOD AND PROGRAM

BACKGROUND OF THE INVENTION

The present invention relates to an information processing method and its apparatus. More particularly, it relates to a storage-device controlling apparatus and its method, and its program.

There exists a storage that has been known as the so-called NAS (: Network Attached Storage). This storage includes a file system such as the NFS (: Network File System), the CIFS (: Common Internet File System), or the DAFS (: Direct Access File System), and is used under a condition of being connected to a LAN (: Local Area Network). In a network into which the NAS has been introduced, an information processing apparatus connected to the network, such as a computer or a mobile information terminal, utilizes, as a data storage location, a storage region that the NAS provides. For example, a personal computer mounts thereon the storage region that the NAS provides as a volume equivalent to its own disk drive, thereby utilizing the NAS as if the NAS were its own disk drive.

Let's consider a case where an information processing apparatus, which is connected to a LAN into which the NAS has been introduced, tries to access a Web server on the Internet. The user of the information processing apparatus operates, e.g., the Web browser so as to surf around the link set up on Web pages. Otherwise, the user inputs a URL (: Uniform Resource Locator) or the like, thereby accessing a Web page that the user has selected as the object. Also, if, in the access to the Web server like this, the user tries to download a file from the Web server during the browsing of the Web page, the user utilizes a Web-page download function or the like, thereby downloading the file from the Web server onto the information processing apparatus in accordance with a protocol such as the HTTP (: Hypertext Transfer Protocol) or the FTP (: File Transfer Protocol).

As a related background technology, there exists the one disclosed in JP-A-11-272711. This technology, however, includes none of an intention that the file downloaded from the Web server be finally managed by the NAS.

SUMMARY OF THE INVENTION

When the file downloaded from the Web server is finally managed by the NAS, the user transfers, to the NAS, the file downloaded onto the disk drive of the information processing apparatus. If the storage region of the NAS has been mounted as the volume on the information processing apparatus, it turns out that this transfer is executed in correspondence with a displacement operation of the file from the disk drive of the information processing apparatus to the logical volume corresponding to the storage region of the NAS.

Here, in the case where, in this way, the file downloaded from the Web server is finally managed by the NAS, it turns out that the information processing apparatus functions as a file relay apparatus between the Web server and the NAS.

If, however, the downloaded file need not be stored into the information processing apparatus, there is no need of using the information processing apparatus as the file relay apparatus in executing the download. Rather, it is more rational to download the file directly from the Web server onto the NAS. Also, executing the download of the file increases a processing load imposed on the information processing apparatus. Accordingly, from a viewpoint of reducing the processing load on the information processing apparatus as well, it is more rational to download the file directly from the Web server onto the NAS via none of the information processing apparatus. Moreover, in the case where the information processing apparatus has become the file relay apparatus, it turns out that there occur at least two-time traffics, i.e., the download from the Web server onto the information processing apparatus, and the file transfer from the information processing apparatus to the NAS. This situation inevitably increases a traffic within the LAN in comparison with the case of downloading the file directly onto the NAS.

The present invention has been devised from the viewpoint like this. Thus, an object of the present invention is to provide a storage-device controlling apparatus and its method, and its program.

The storage-device controlling apparatus, which is the primary invention in the present invention, includes the following configuration components: A file system for receiving a data input/output request on file-name specification basis, and executing the input/output of data with respect to a storage device in response to the data input/output request, the data input/output request being transmitted via a network, a unit for accepting a proxy request for substitute-executing the download of a file from a Web server on the Internet, the proxy request being transmitted based on the HTTP protocol via the network, a unit for establishing a connection with the Internet, a unit for downloading the file from the Web server in response to the proxy request, and a unit for storing the downloaded file into the storage device by using the file system.

Incidentally, the other characteristics of the present invention will become apparent from the descriptions in the present specification and the accompanying drawings.

BRIEF DESCRIPTION OF THE DRAWINGS

FIG. 8A and FIG. 8B are the diagrams for indicating the concept of the present invention.

DETAILED DESCRIPTION OF THE EMBODIMENTS

Configuration of Computer System

Figure 1:
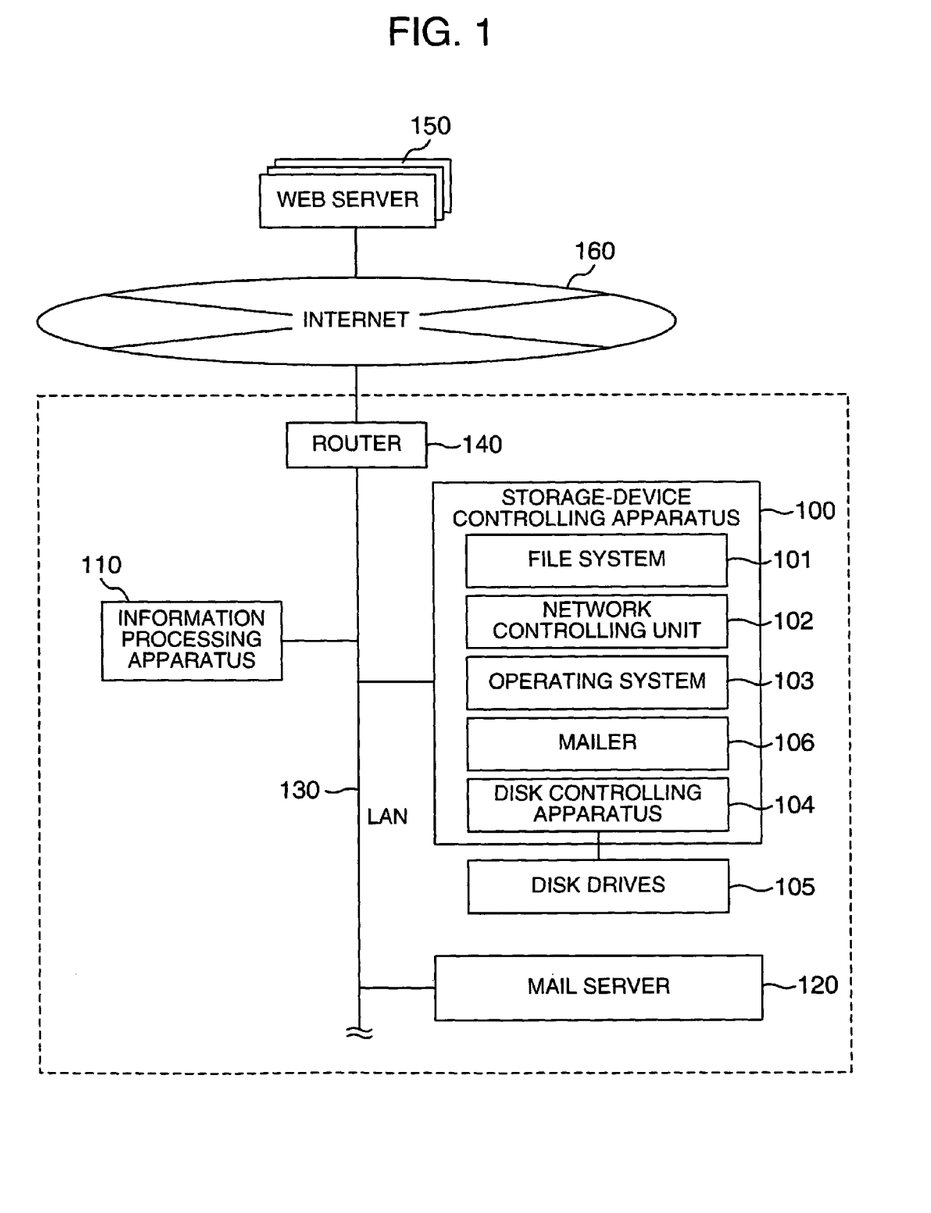
FIG. 1 is a diagram for illustrating the configuration of a computer system according to one embodiment of the present invention.

FIG. 1 illustrates the configuration of a computer system that will be explained as one embodiment of the present invention. An information processing apparatus 110, a storage-device controlling apparatus 100, and a mail server 120 are connected to a network such as a LAN 130 installed within a building or the like. The LAN 130 is connected to the Internet 160 via a router 140. The information processing apparatus 110 is a computer including a CPU (: Central Processing Unit) and a memory, such as a personal computer, a workstation, or a general-purpose machine. The information processing apparatus 110 operates and manages, e.g., an automatic-teller-machine system at a bank and an airplane's seat reservation system.

The storage-device controlling apparatus 100 includes the following configuration components: A CPU, a memory, a network controlling unit 102 for establishing a connection with the LAN 130, a storage device such as disk drives 105, and a disk controlling apparatus 104 for controlling the input/output of data with respect to the disk drives 105. Hard disk drives, e.g., are used as the disk drives 105. The network controlling unit 102 provides a function about the transmission/reception of data between the controlling apparatus 100 and the LAN 130 in accordance with the Ethernet (trademark) and a protocol such as the TCP/IP. Also, the network controlling unit 102 provides a function of performing communications in accordance with the protocol such as the HTTP (: Hypertext Transfer Protocol) or the FTP (: File Transfer Protocol) between the controlling apparatus 100 and a Web server 150 on the Internet 160 and the information processing apparatus 110.

The storage-device controlling apparatus 100 implements therein at least one or more units of disk drives 105. In some cases, the disk controlling apparatus 104 functions as a RAID controller for controlling the disk drives 105 in accordance with the RAID scheme. Additionally, a configuration is also allowable where the disk drives 105 are contained in a housing that differs from the one containing the storage-device controlling apparatus 100.

In the storage-device controlling apparatus 100, an operating system 103 is running. Also, a file system 101 is operating under this operating system 103. Here, the file system 101 receives a data input/output request on the file-name specification basis, and executes the input/output of the data with respect to the disk drives 105 in correspondence with the data input/output request, the data input/output request being transmitted from the information processing apparatus 110 via the LAN 130. Namely, the storage-device controlling apparatus 100 functions as a NAS server with respect to the information processing apparatus 110 connected to the LAN 130.

The NFS, the CIFS, or the DAFS, e.g., is employed as the above-described file system 101. Also, a mailer 106 operates on the operating system 103. The mailer 106 performs the transmission/reception of an electronic mail via the LAN 130 in accordance with the instruction from an application program that will run on the operating system 103.

Incidentally, the network controlling unit 102 receives data transmitted in accordance with the TCP/IP protocol via the LAN 130. After having received this data, the unit 102, based on a port number described therein, passes the data to a software program for performing protocol processing corresponding to the port number. This allows the storage-device controlling apparatus 100 to perform the processing corresponding to plural protocols.

The mail server 120 is a computer such as a personal computer or a workstation. The mail server 120 operates therein a software program for functioning a mail protocol such as the SMTP (: Simple Mail Transfer Protocol) or the POP (: Post Office Protocol). Having received an electronic mail transmitted from the information processing apparatus 110, the storage-device controlling apparatus 100, or the like in accordance with the above-described mail protocol, the mail server 120 transfers the electronic mail to an apparatus specified as the address.

Download Proxy Function

When the information processing apparatus 110 tries to download a file from the Web server 150, the storage-device controlling apparatus 100 exhibits a function of substitute-executing this download. If, e.g., the user of the information processing apparatus 110 has intentionally made a download proxy request, the download proxy request from the information processing apparatus 110 to the storage-device controlling apparatus 100 is transmitted independently of the user's will, i.e., automatically, from the information processing apparatus 110 to the storage-device controlling apparatus 100 via the LAN 130. Incidentally, "intentionally" refers to, e.g., the following case: When the user tries to download the file from the Web server 150 by operating the Web browser that will run on the information processing apparatus 110, a view for inquiring about whether or not the proxy request should be transmitted is displayed on the display of the information processing apparatus 110. Then, if, interactively to this view, the user gives an instruction to the effect that the proxy request should be made, the proxy request is transmitted to the storage-device controlling apparatus 100. This is the case of the above-described "intentionally". Also, "independently of the user's will" refers to, e.g., the following case: When the user tries to download the file from the Web server 150 by operating the Web browser, the processing for automatically transmitting the proxy request to the storage-device controlling apparatus 100 is started in the background.

Having received the proxy request transmitted from the information processing apparatus 110, the storage-device controlling apparatus 100 accesses the Web server 150 via the Internet 160, then storing the desired file into the disk drives 105 by using the file system 101. Moreover, the user of the information processing apparatus 110 accesses the storage-device controlling apparatus 100 via the LAN 130, thereby acquiring and utilizing the file thus downloaded.

Explanation of Processing

Figure 2:
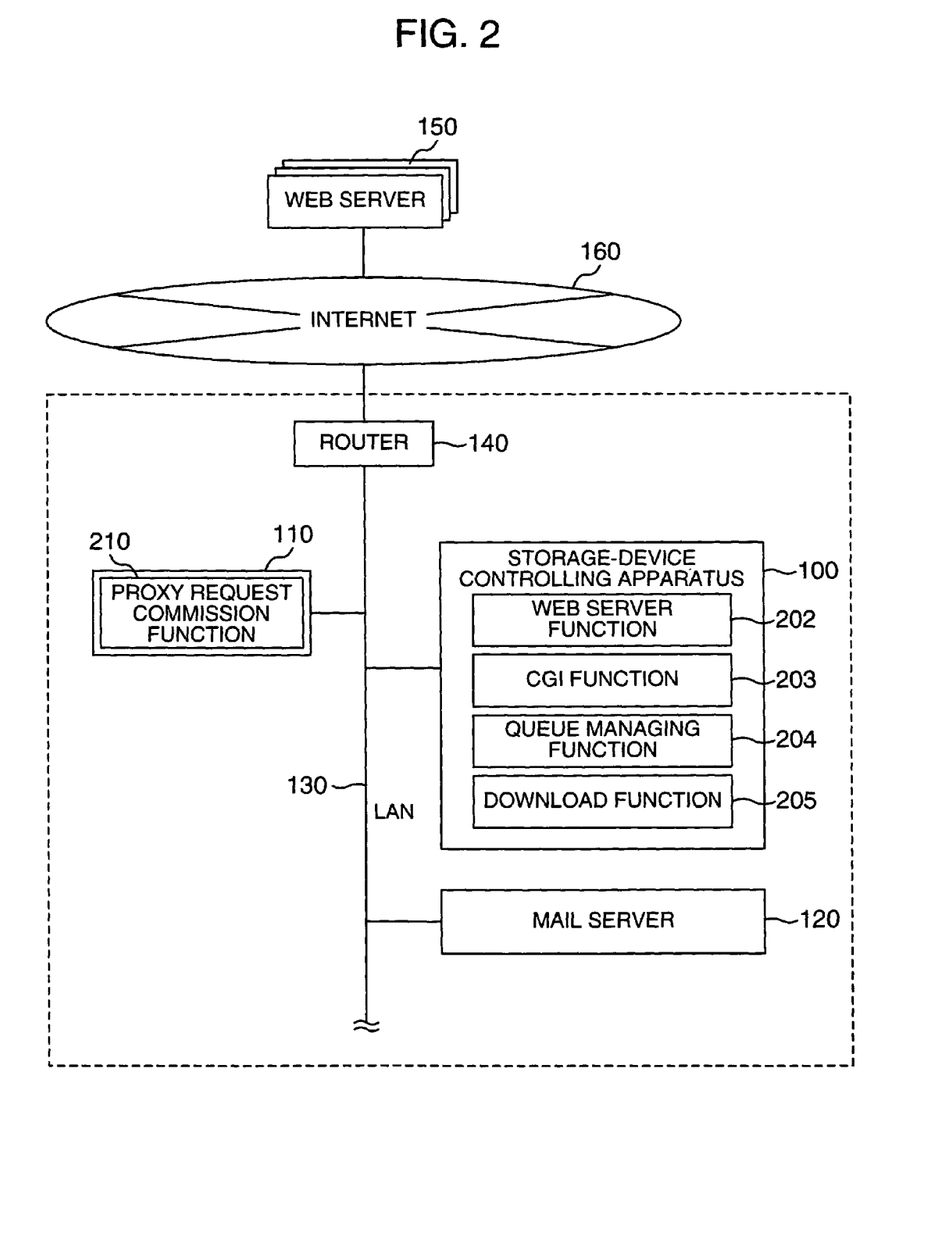
FIG. 2 is a diagram for illustrating the software configuration according to the one embodiment of the present invention.

Next, referring to a software configuration diagram illustrated in FIG. 2 and a flowchart illustrated in FIG. 3, explanation will be given below concerning a specific mechanism of the download proxy function executed as explained above.

<Acceptance of Proxy Request>

Figure 3:
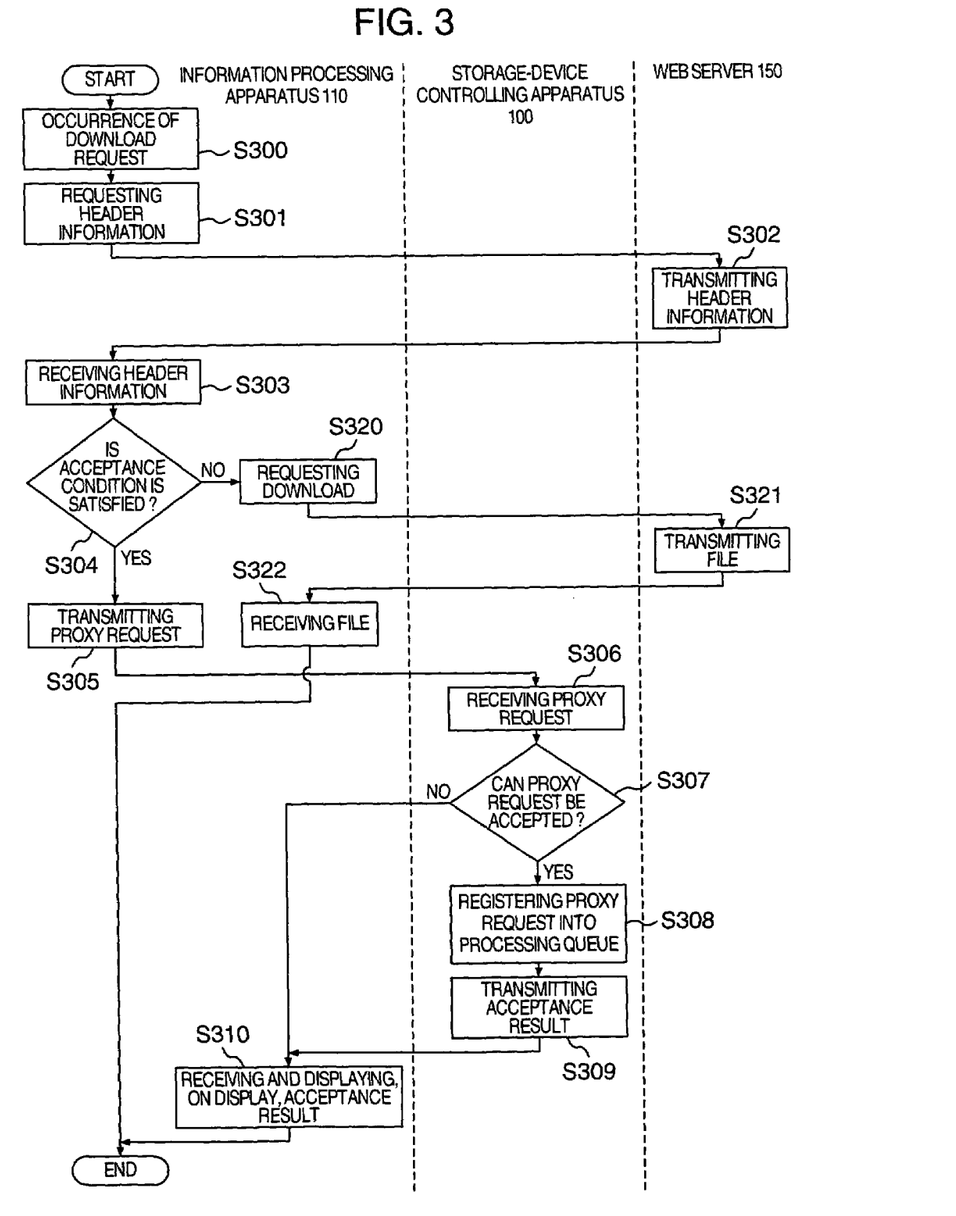
FIG. 3 is a diagram for illustrating a flowchart for explaining a processing about a download proxy function according to the one embodiment of the present invention.

As illustrated in FIG. 3, a request for downloading a file from the Web server 150 occurs by being caused by, e.g., the operation of the Web browser by the user (Additionally, when the user has been left to select whether or not a proxy request should be transmitted, this request occurs if the user has selected an intention to the effect that the proxy request should be transmitted.) (S300). Then, in this case, the information processing apparatus 110, to the Web server 150 that has provided the file to be downloaded, makes a request for header information on the Web page corresponding to the file (S301). This request is performed using, e.g., the "GET" method (i.e., head request) or the "POST" method in the HTTP protocol. In answer to the request, the Web server 150, as a response thereto, transmits the header information on the corresponding Web page to the information processing apparatus 110 (S302). Then, the information processing apparatus 110 receives this header information (S303). What is worthy of attention here is that, as compared with the case of downloading the file, the information transmitted/received by the request and response is exceedingly smaller in the data size. Accordingly, its communications load is exceedingly small, and also a time needed for this processing is extremely short.

Next, a proxy request commission function 210 of the information processing apparatus 110 judges whether or not the file download proxy request should be transmitted to the storage-device controlling apparatus 100 (S304). This judgement is performed by making comparison between information on the file to be downloaded and an acceptance condition stored in the information processing apparatus 110. Here, as the information on the file, there is used e.g., the header information fetched from the Web server 150 in the processing at (S301) to (S303). Also, in some cases, there is used information on the file which has been stored in the memory and a disk drive of the information processing apparatus 110. The above-described acceptance condition refers to, e.g., the following condition: The file data-size is larger than a threshold-value size, the file data-size is smaller than the threshold-value size, the file is a specified type of file, the file name is a specified file name, or the updating time-and-date satisfies a set-up condition. In addition to a case where these conditions are applied alone independently, there are some cases where plural conditions are used in a combined manner.

If, at (S304), the information processing apparatus 110 has judged that the acceptance condition is not satisfied (S304: No), the information processing apparatus 110 accesses, by itself, the Web server 150 via the Internet 160, thereby downloading the file (S320 to S322). This download is performed by communications using the protocol such as the FTP or the HTTP.

Meanwhile, if, at (S304), the information processing apparatus 110 has judged that the acceptance condition is satisfied (S304: Yes), the information processing apparatus 110 automatically transmits, to the storage-device controlling apparatus 100, the proxy request for commissioning the proxy of the file download (S305). Incidentally, the transmittance of this proxy request is performed from the Web browser by communications using the HTTP protocol. Namely, the use of the HTTP protocol makes it possible to easily implement the functions of the information processing apparatus 110 of the present invention, as long as the information processing apparatus is a computer into which the Web browser has been installed.

The storage-device controlling apparatus 100 receives the proxy request by using a Web server function 202 (S306). Next, the controlling apparatus 100, by using a CGI function 203, judges whether or not this proxy request can be accepted (S307). The judgement condition here is, e.g., a condition of whether or not there still exists an available capacity in the disk drives 105. Also, if the disk drives 105 and the capacity thereof have been set up which are available in each information processing apparatus 110 corresponding to each user ID attached on each user basis, the disk drives 105 and the capacity thereof can also be selected as the condition. Additionally, this condition is set up depending on, e.g., an operation/management environment of the storage-device controlling apparatus 100.

Figure 4:
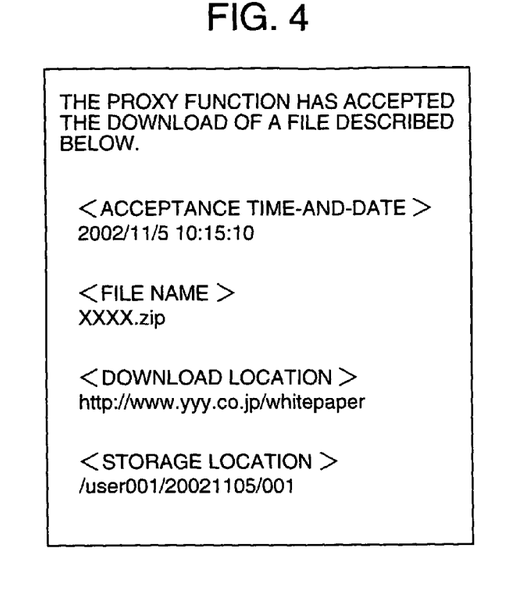
FIG. 4 is a diagram for illustrating an image displayed on the display of an information processing apparatus in connection with the acceptance of a proxy request according to the one embodiment of the present invention.

If, in the above-described judgement, the storage-device controlling apparatus 100 has judged that the proxy request can be accepted (S307: Yes), the Web server function 202 registers the proxy request into a processing queue managed by a memory (not shown) of the storage-device controlling apparatus 100 (S308). Having registered the proxy request into the processing queue (S308), the Web server function 202 of the storage-device controlling apparatus 100 transmits a message to the effect that the controlling apparatus 100 has accepted the proxy request, information (e.g., directory name) for identifying a storage location of the to-be-downloaded file on the disk drives 105, and the like (S309). Moreover, as illustrated in, e.g., FIG. 4, the information processing apparatus 110, which has received the message, the information, and the like, displays on the display the message to the effect that "The storage-device controlling apparatus has accepted the download of a file described below.", the acceptance time-and-date, the file name, the information for identifying the storage location in the disk drives 105, and the like (S310). This allows the user to know that the storage-device controlling apparatus 100 will substitute-execute the download of the file, and the storage location of the to-be-downloaded file.

Meanwhile, if, in the processing at (S307), the CGI function 203 of the storage-device controlling apparatus 100 has judged that there exists no available capacity in the disk drives 105 (S307: No), the storage-device controlling apparatus 100 transmits, to the information processing apparatus 110, a message to the effect that there exists no available capacity. Furthermore, the information processing apparatus 110, which has received this message, displays on the display a message saying, e.g., "There exists no available capacity." or "It is beyond the capacity." (S310). This allows the user to know that there exists no available capacity in the disk drives 105.

<Processing about Download>

Figure 5:
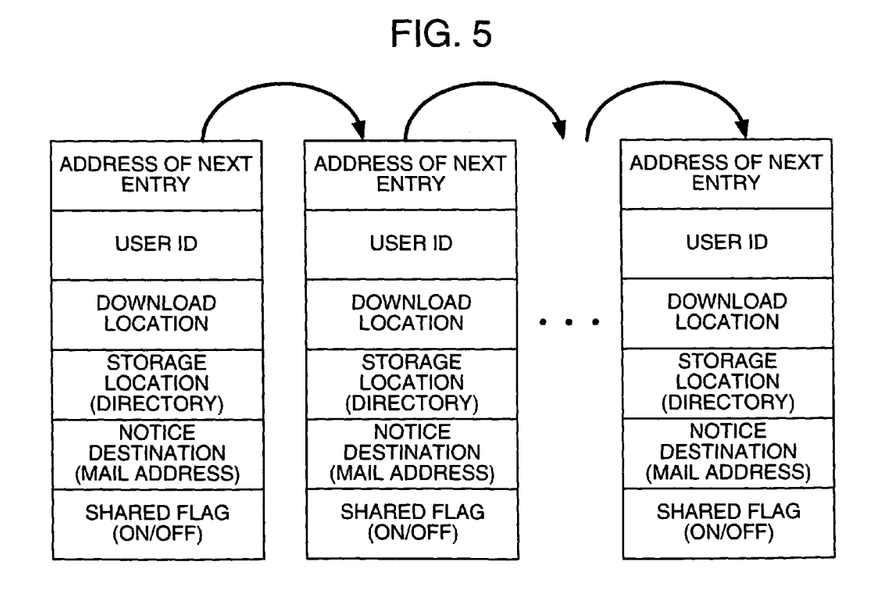
FIG. 5 is a diagram for illustrating a state of the proxy request registered in a processing queue according to the one embodiment of the present invention.

Next, explanation will be given below concerning processing about the proxy request registered in the processing queue. A queue managing function 204 of the storage-device controlling apparatus 100 monitors contents of the processing queue in real time. FIG. 5 illustrates, as one example, an image of the proxy requests registered in the processing wait-queue. Additionally, it is assumed that each proxy request is accompanied by a download location (i.e., URL), a storage location (i.e., directory) in the disk drives 105, a mail address for transmitting a message to the effect that the download has been completed, and the like.

Basically, based on the FIFO (: First In First Out) scheme, the queue managing function 204 processes the proxy requests registered in the processing queue. With respect to a proxy request for which a condition is set up, however, the function 204 modifies the processing sequence in accordance with the condition. For example, a condition on the processing for a proxy request is set up beforehand on each user ID basis, then processing the proxy request in accordance with the condition. Another condition is that, e.g., the processing is started when a predetermined number of proxy requests set up on each user ID basis have been accumulated within the processing queue. Incidentally, in this case, it is assumed that each proxy request transmitted from each information processing apparatus 110 is accompanied by each user ID. Also, still another condition can be that the processing about a proxy request is started when it comes to a point-in-time that the user had set up in advance. Setting up the condition like this allows a processing that the user necessitates to be processed with the highest priority. This makes it possible to operate and manage the storage-device controlling apparatus 100 with a high efficiency.

Figure 6:
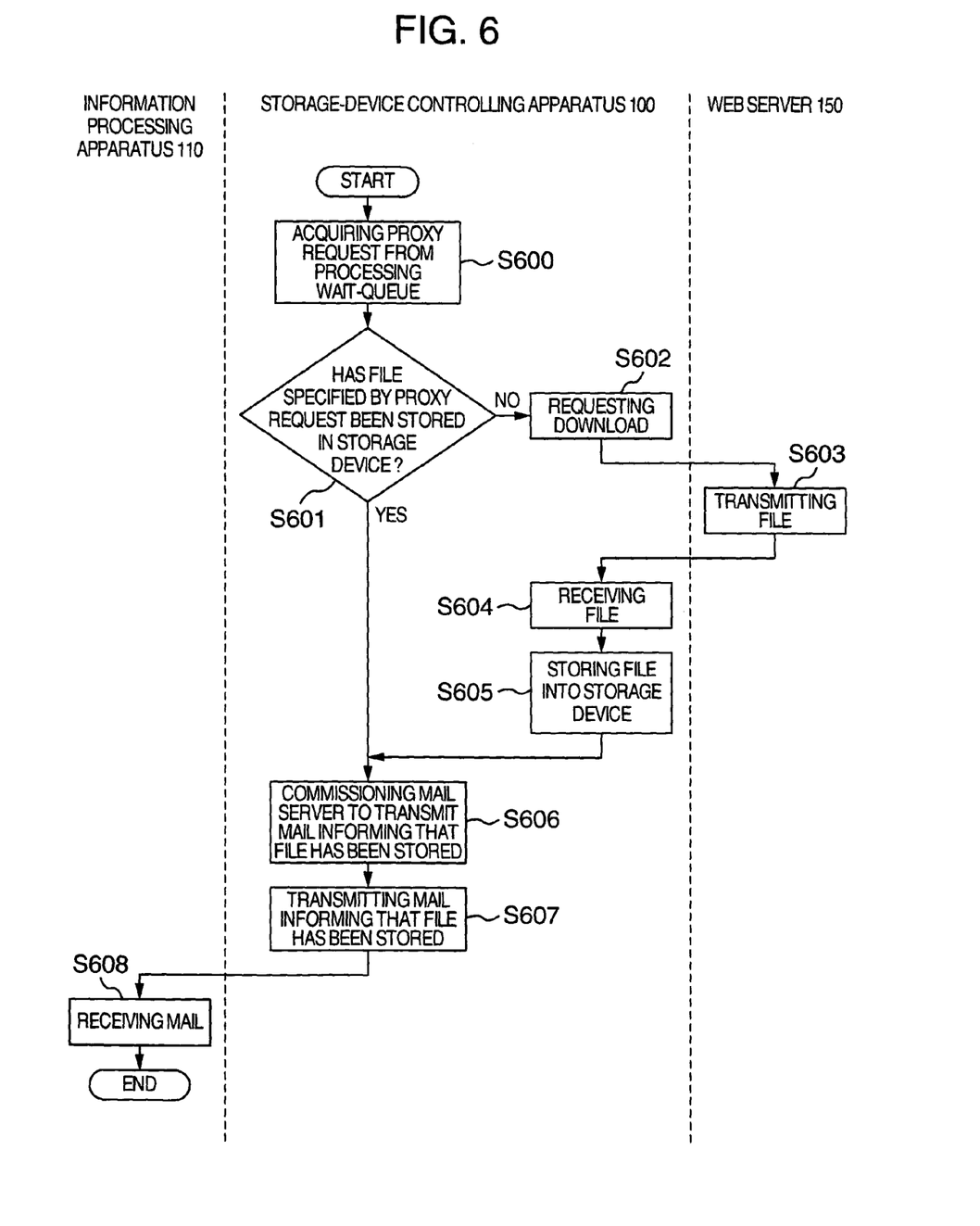
FIG. 6 is a diagram for illustrating a flowchart for explaining a processing about the proxy request registered in the processing queue according to the one embodiment of the present invention.

FIG. 6 is a flowchart for explaining the processing about the proxy requests registered in the processing queue. Having acquired a proxy request from the processing queue (S600), the queue managing function 204 of the storage-device controlling apparatus 100 starts the processing about the proxy request. Here, if a file specified by the proxy request has been already stored in the disk drives 105 (S601: Yes), a download function 205 of the storage-device controlling apparatus 100 does not execute the download of the file from the Web server 150. Furthermore, the download function 205 commissions the mail server 120 to transmit an electronic mail to a mail address of the information processing apparatus 110 that had made the proxy request (S606). Here, the electronic mail describes therein contents such as a message to the effect that the download had been completed, the file name specified in the proxy request, and the storage location of the file in the storage device. Additionally, this mail address accompanies the proxy request that the information processing apparatus 110 has transmitted to the storage-device controlling apparatus 100. Also, this mail address is, e.g., the mail address of the user of the information processing apparatus 110. Having received the commission for the electronic-mail transmission, the mail server 120 transmits, to the mail address, the electronic mail describing the above-described contents by using the mailer 106 (S607). The user receives this electronic mail by using a mailer or the like (S608). In this way, if the file specified by the proxy request has been already stored in the disk drives 105, no download is executed. This reduces a processing load imposed on the storage-device controlling apparatus 100. Also, there occurs none of a communications load that occurs because of the access made to the Web server 150.

Meanwhile, if, at (S601), the file specified by the proxy request does not exist in the disk drives 105 (S601: No), the download function 205 of the storage-device controlling apparatus 100 executes the download of the file specified by the proxy request. Namely, the download function 205, with respect to a URL specified by the proxy request, makes a download request for downloading the file (S602). Having received this download request, the Web server 150 transmits, to the storage-device controlling apparatus 100, the file specified by the download request (S603). Moreover, after having received the file transmitted from the Web server 150 (S604), the download function 205 of the storage-device controlling apparatus 100 stores the file into a storage location in the disk drives 105 (S605). Here, as the storage location of the file in the disk drives 105, if, e.g., a storage location has been specified in the proxy request that the information processing apparatus 110 had transmitted, this location may be selected as the storage location. Also, as will be explained later, a storage location may be selected which corresponds to the user ID or the mail address. A creation method of creating a specific storage location (e.g., directory) will be explained later. Processings at (S606) to (S608) are basically the same as the ones explained earlier. Incidentally, the electronic mail transmitted at (S607) describes therein the message to the effect that the download had been completed, the file name of the downloaded file, the storage location of the downloaded file, and the like. The user receives this electronic mail by using the mailer or the like (S608). This permits the user to know at which storage location in the disk drives 105 and in what file name the file has been stored whose substitute-executed download had been requested.

<Concerning Storage Location of File>

The files that the storage-device controlling apparatus 100 had downloaded in the proxy for the information processing apparatus 110 are stored into storage locations generated based on the information that accompanies the proxy requests. In this embodiment, each storage location is generated as a directory managed by the file system 101. The directory can be generated not only as a specific-user-oriented directory, but also as a directory to be shared by plural persons. Whether the directory should be generated as the specific-user-oriented directory or the plural-persons-shared directory is determined depending on the shared flag transmitted in accompaniment with a proxy request.

Figure 7A:
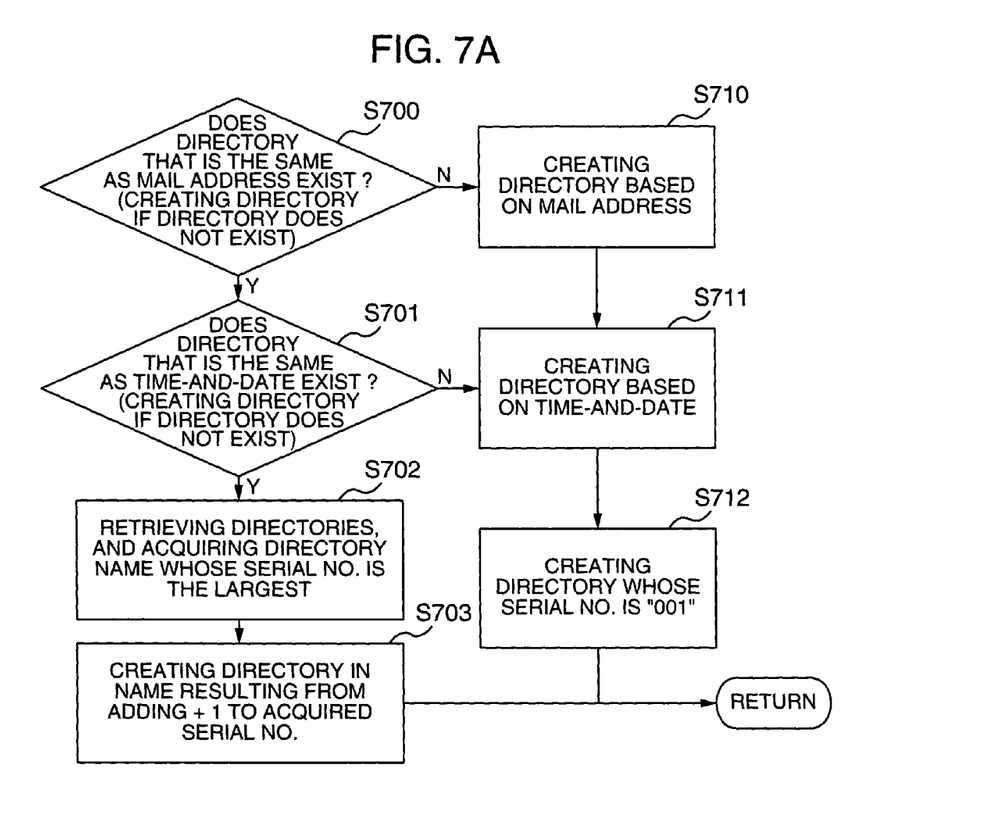
FIG. 7A illustrates a flowchart for explaining a directory generation processing performed in a storage-device controlling apparatus in a case where the shared flag that accompanies a proxy request is "OFF" according to the one embodiment of the present invention.
Figure 7B:
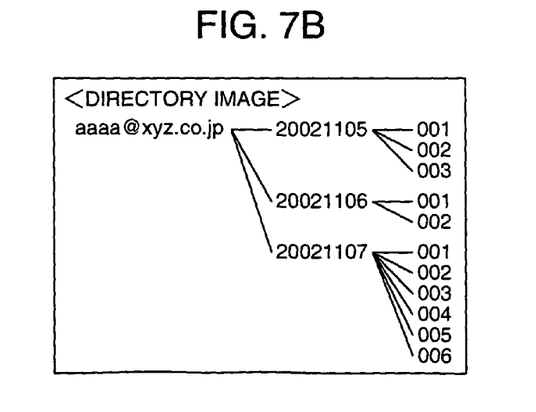
FIG. 7B is a diagram for explaining a manner in which directories are generated by this processing according to the one embodiment of the present invention.

FIG. 7A illustrates a flowchart for explaining directory generation processing performed in the storage-device controlling apparatus 100 in the case where the shared flag that accompanies a proxy request is "OFF", i.e., the case where the directory has been specified to be generated as the specific-user-oriented directory. FIG. 7B is a diagram for explaining a manner in which directories are generated by this processing.

When the storage-device controlling apparatus 100 has received a proxy request whose shared flag is "OFF", the apparatus 100, at first, checks whether or not a directory, whose directory name is the same as a mail address transmitted in accompaniment with the proxy request, exists already on the disk drives 105 (S700). Here, if the directory exists (S700: Y), the apparatus 100 checks whether or not, at a hierarchical-structure level lower than the directory, a directory further exists whose directory name is a time-and-date at which the proxy request had been accepted (S701). Here, if such a directory exists (S701: Y), the apparatus 100 retrieves directories existing further at a level lower than the particular directory, then acquiring the directory name of a directory whose Serial No. is the largest of such directories (S702). Moreover, the apparatus 100 creates a directory whose directory name is a number resulting from incrementing (+1) the Serial No. thus acquired (S703).

Meanwhile, if, at (S700), the directory whose directory name is the same as the mail address does not exist (S700: N), the storage-device controlling apparatus 100 newly creates the directory whose directory name is the mail address (S710). Furthermore, at the level lower than the directory, the apparatus 100 creates the directory further whose directory name is the time-and-date at which the proxy request had been accepted (S711). In addition, at the level lower than the directory thus created, the apparatus 100 creates a directory further whose directory name is Serial No. "001" (S712). Also, if, at (S701), the directory whose directory name is the same as the time-and-date does not exist (S701: N), the apparatus 100 also performs the processing at (S711) and (S712), thereby creating the directories.

Incidentally, here, the shared flag that accompanies the proxy request is "OFF". Consequently, the storage-device controlling apparatus 100 sets up each directory created as described above, so that an access thereto will be permitted with respect to the user ID that accompanies the proxy request.

Figure 8A:
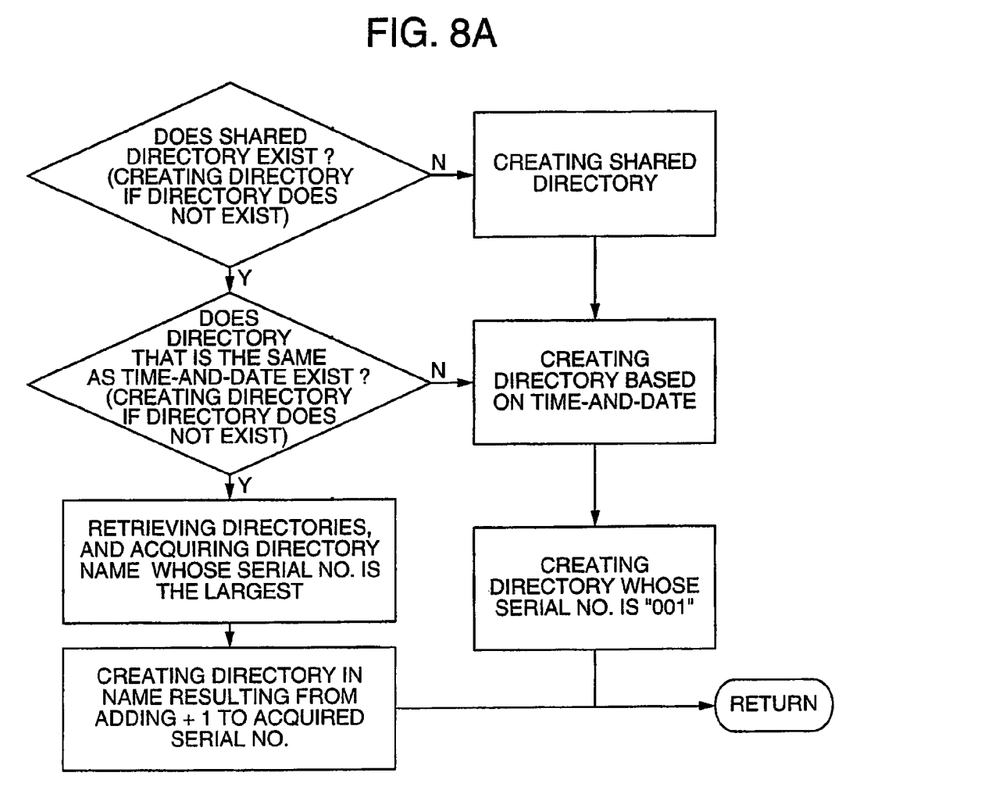
FIG. 8A illustrates a flowchart for explaining a directory generation processing performed in the storage-device controlling apparatus in a case where the shared flag that accompanies the proxy request is "ON", i.e., a case where the directory has been specified to be generated as a one shared by plural persons, according to the one embodiment of the present invention.
Figure 8B:
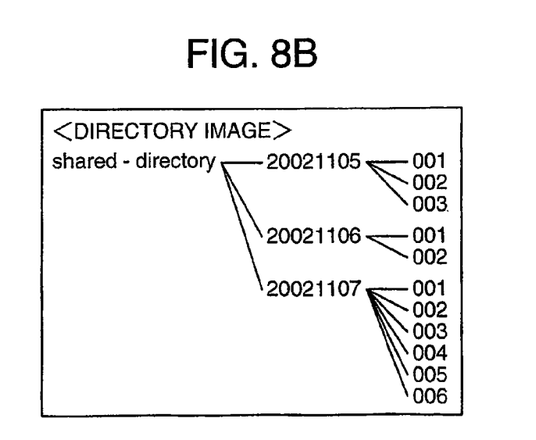
FIG. 8B is a diagram for explaining a manner in which directories are generated by this processing according to the one embodiment of the present invention.

FIG. 8A illustrates a flowchart for explaining a directory generation processing performed in the storage-device controlling apparatus 100 in the case where the shared flag that accompanies the proxy request is "ON", i.e., the case where the directory has been specified to be generated as the plural-persons-shared directory. FIG. 8B is a diagram for explaining a manner in which directories are generated by this processing. The manner in which the directories are created is basically the same as the case illustrated in FIG. 7A. Incidentally, here, the shared flag that accompanies the proxy request is "ON". Consequently, the storage-device controlling apparatus 100 sets up each directory created as described above, so that an access thereto will be permitted with respect to the plural user IDs that accompany the proxy requests.

So far, the explanation has been given concerning the storage-device controlling apparatus and the like according to the present invention. The above-described embodiment of the present invention, however, is intended not to limit the present invention but to facilitate the understanding thereof. Moreover, it is needless to say that the present invention can be modified and improved without departing from its essence and spirit, and that the present invention includes its equivalents.

According to the present invention, it becomes possible to provide the storage-device controlling apparatus, the information processing apparatus, and the program.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage-device controlling apparatus in a storage system, comprising:

a file system for receiving a data input/output request on file-name specification basis, and executing the input/output of data with respect to a storage device included in the file system in response to said data input/output request, said data input/output request being transmitted from an information processing apparatus connected to the storage-device controlling apparatus via a network;

a processing device operative to perform steps of:

receiving a proxy request for substitute-executing the download of a file from a Web server on the Internet, said proxy request being transmitted from the information processing apparatus based on HTTP protocol via said network;

establishing a connection with the Internet;

downloading said file from said Web server in response to said proxy request; and storing said downloaded file into said storage device via said file system and a processing queue for storing a plurality of proxy requests therein, wherein said processing device is operative to perform a step of modifying an order of processing of the proxy requests that have been registered in said processing queue, wherein a first condition for starting a processing for each proxy request is stored on a proxy request basis, processing of the proxy requests being started based on said first condition;

wherein a second condition is stored for determining whether or not to transmit said proxy request to said storage-device controlling apparatus, said second condition being about said file that becomes a target of said download; and checking whether or not said file satisfies said second condition when there occurs said download request for downloading said file from said Web server, wherein, if said file does not satisfy said second condition, said proxy request will not be transmitted to said storage-device controlling apparatus.

2. The storage-device controlling apparatus according to claim 1, wherein said processing device is operative to perform further steps of:

accepting said proxy request and transmitting to a sender of said proxy request information that identifies a storage location of said file in said storage device, said file being downloaded in accordance with said proxy request.

3. The storage-device controlling apparatus according to claim 1, wherein said processing device is operative to perform further steps of:

checking whether or not, when said proxy request is accepted, said file specified by said proxy request is already stored in said storage device; and wherein, if said file has been stored in said storage device, then said download of said file will not be executed.

4. The storage-device controlling apparatus according to claim 1, wherein said processing device is operative to perform further steps of:

transmitting a message to a sender of said proxy request via said network when said file is stored into said storage device, said message notifying that said file has been stored into said storage device.

5. An information processing apparatus, comprising:

means for transmitting a proxy request to a storage-device controlling apparatus via a network and based on the HTTP protocol, said storage-device controlling apparatus being connected to said information processing apparatus via said network, said storage-device controlling apparatus, comprising:

means for establishing a connection with the Internet;

means for accessing a Web server on the Internet;

a file system that, when there occurs a download request for downloading a file from said Web server, receives a data input/output request on file-name specification basis, and executes the input/output of said data with respect to a storage device included in the file system in response to said data input/output request, said proxy request being transmitted from an information processing apparatus;

means for accepting a proxy request for substitute-executing said download of said file from said Web server on the Internet, said proxy request being transmitted from the information processing apparatus based on the HTTP protocol via said network;

means for downloading said file from said Web server in response to said proxy request;

means for storing said downloaded file into said storage device by using said file system;

a processing queue for storing a plurality of proxy requests therein; and means for modifying an order of processing of the proxy requests that have been registered in said processing queue, wherein a first condition for starting a processing for each proxy request is stored on a proxy request basis, processing of the proxy requests being started based on said first condition;

means for storing a second condition for determining whether or not to transmit said proxy request to said storage-device controlling apparatus, said second condition being about said file that becomes a target of said download; and means for checking whether or not said file satisfies said second condition when there occurs said download request for downloading said file from said Web server, wherein, if said file does not satisfy said second condition, said proxy request will not be transmitted to said storage-device controlling apparatus.

6. The information processing apparatus according to claim 5, further comprising:
means for downloading said file by accessing said Web server by itself if said proxy request is not transmitted to said storage-device controlling apparatus.

7. The information processing apparatus according to claim 5, further comprising:
means for accessing said Web server via the Internet so as to acquire information on said file when there occurs said download request for downloading said file from said Web server, and
means for judging whether or not said file satisfies said second condition by making a comparison between said information and said second condition.

8. The information processing apparatus according to claim 7, wherein said second condition includes at least one of the following conditions: the data size of said file is larger than a threshold-value size, said data size of said file is smaller than said threshold-value size, said file is a specified type of file, the file name is a specified file name, and the updating time-and-date satisfies a set-up condition.

9. The information processing apparatus according to claim 5, further comprising:
means for allowing a Web browser to come into operation, said download request for downloading said file from said Web server occurring by being caused by said operation of said Web-browser.

10. A program executing on an information processing apparatus for allowing said information processing apparatus to implement a function of transmitting a proxy request to a storage-device controlling apparatus via a network and based on the HTTP protocol when there occurs a download request for downloading a file from a Web server on the Internet, said storage-device controlling apparatus being connected to said information processing apparatus via said network,
said storage-device controlling apparatus comprising a file system for receiving a data input/output request on file-name specification basis, and executing the input/output of said data with respect to a storage device included in the file system in response to said data input/output request, said data input/output request being transmitted from an information processing apparatus via a network;
said storage-device controlling apparatus operative to accept said proxy request for substitute-executing said download of said file from said Web server on the Internet, said proxy request being transmitted from the information processing apparatus based on the HTTP protocol via said network;
said storage-device controlling apparatus further operative to establish a connection with the Internet;
said storage-device controlling apparatus further operative to download said file from said Web server in response to said proxy request;
said storage-device controlling apparatus further operative to store said downloaded file into said storage device by using said file system; and
said storage-device controlling apparatus comprising a processing queue for storing a plurality of proxy requests therein,
wherein said storage-device controlling apparatus is further operative to modify an order of processing of the proxy requests that have been registered in said processing queue,
wherein a first condition for starting a processing for each proxy request is stored on a proxy request basis, processing of the proxy requests being started based on said first condition;
wherein said information processing apparatus stores a second condition for determining whether or not to transmit said proxy request to said storage-device controlling apparatus, said second condition being about said file that becomes a target of said download; and
checks whether or not said file satisfies said second condition when there occurs said download request for downloading said file from said Web server;
wherein, if said file does not satisfy said second condition, said proxy request will not be transmitted to said storage-device controlling apparatus.

11. The program according to claim 10, which further allows said information processing apparatus to implement:
a function of downloading said file by accessing said Web server by itself if said proxy request is not transmitted to said storage-device controlling apparatus.

12. The program according to claim 10, which further allows said information processing apparatus to implement:
a function of accessing said Web server via the Internet so as to acquire information on said file when there occurs said download request for downloading said file from said Web server; and
a function of judging whether or not said file satisfies said second condition by making a comparison between said information and said second condition.

* * * * *